E. B. ARNOLD.
WAVE FORCE UTILIZING DEVICE.
APPLICATION FILED MAY 31, 1911.
1,024,816.
Patented Apr. 30, 1912.
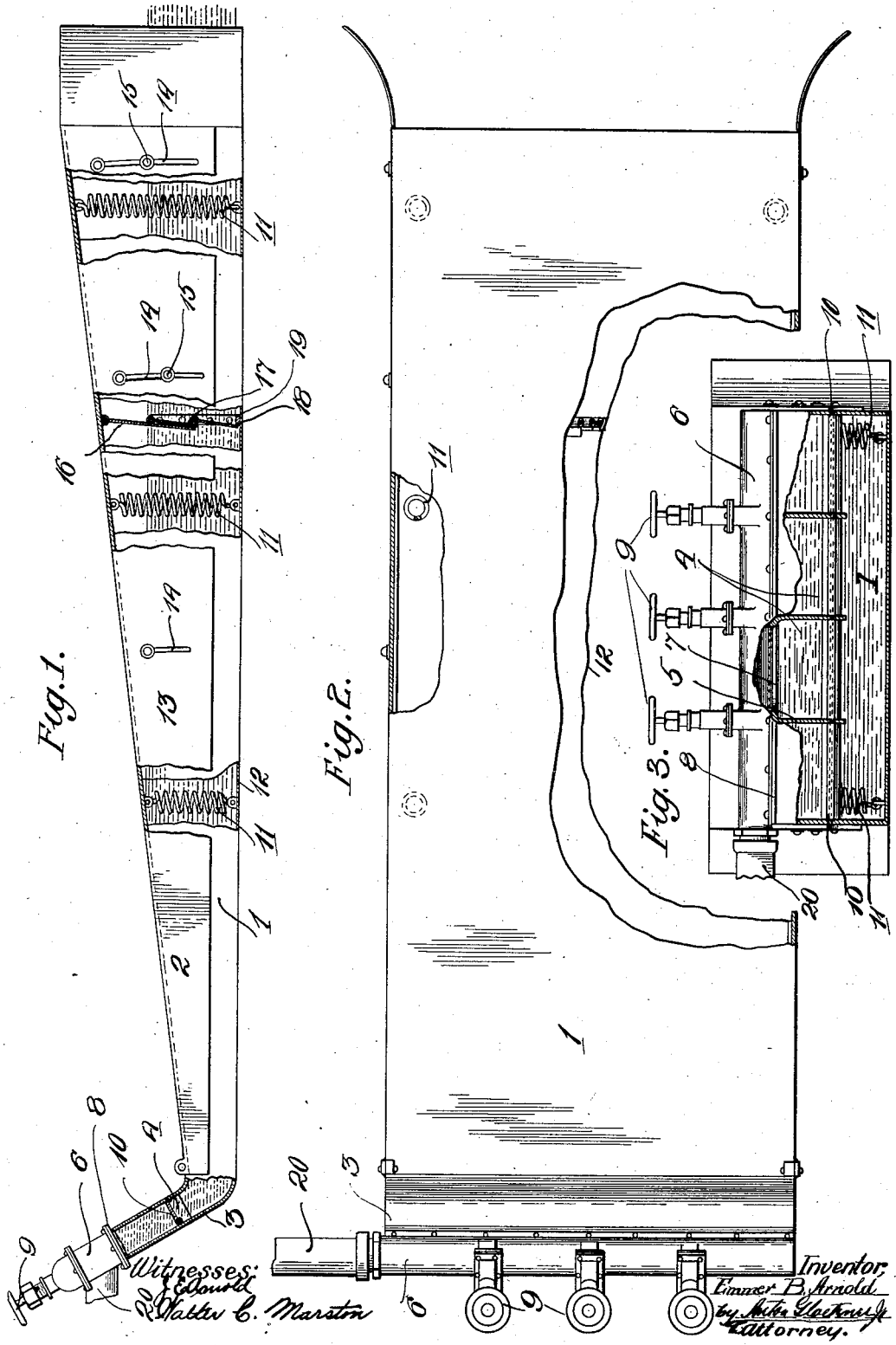

UNITED STATES PATENT OFFICE.

EMMER B. ARNOLD, OF LOS ANGELES, CALIFORNIA.

WAVE-FORCE-UTILIZING DEVICE.

1,024,816.   Specification of Letters Patent.   Patented Apr. 30, 1912.

Application filed May 31, 1911. Serial No. 630,518.

*To all whom it may concern:*

Be it known that I, EMMER B. ARNOLD, a citizen of the United States, residing at Los Angeles, in the county of Los Angeles and State of California, have invented a certain new and useful Wave-Force-Utilizing Device, of which the following is a specification.

My invention relates to an apparatus for utilizing the force of waves, and particularly to a means for obtaining from the waves the highest available compression, which may serve as a direct medium of force or as a prime element of motive power.

Heretofore it has been attempted to employ the force of the waves by the pendulous motion given to members that were disposed in the waves, and connected to pumps or other mechanism for the secondary transference of power. That is to say, the utilization of the force is and has not been concurrent with the generation; consequently considerable motion is lost, and aside from these considerations, the ever-changing sweep of the waves, together with the currents and counter current are apt to dislocate or shatter the structural elements used in a wave motor of this type.

I have endeavored to dispense with all machinery and mechanism, and, in fact, all arrangements that are primarily impelled by the water force, and in contradistinction to the methods above described for harnessing the power of the waves, have devised the apparatus shown in the accompanying drawing, in which the energy of the wave is concentrated to force the water to a suitable height for subsequent use with turbines, water wheels, etc., or for compressing air.

A preferred form of the invention is shown in the accompanying drawing, in which—

Figure 1 is a side elevation, partly in section, showing the device partially submerged, and the valves for controlling the outlet; Fig. 2 is a plan view partly in section, and Fig. 3 is a front end elevation, partly in section, to show the compartments or chambers.

The invention comprises an inclosure 1, arranged to be partially submerged, and having a top 2, tapering from the forward open end into which the waves enter. Contiguous with said inclosure is a constricted passageway 3, divided into several compartments or chambers 4, by plates 5, each such compartment or chamber forming an individual passageway for the water. Such compartments or chambers 4, are in communication with a manifold 6, by an opening 7, in the plate 8, forming the top of the separate compartments. The quantity of the water from the manifold may be controlled by a plurality of gate valves 9, which may be regulated to cut off or reduce the flow of water from one or more of the compartments or chambers. Each of said compartments or chambers is provided with a butterfly or flap valve 10, to prevent the recoil or return of the water that has been forced in the passageway 3.

In some cases it may be desirable to provide the inclosure with a yielding top as shown in Fig. 1, for the purpose of offsetting the sudden thrust due to the powerful impact of the waves and to aid in compressing the water therein into the passageway to the outlet. To this end I provide a plurality of helical springs 11, which are connected to the top 2, and bottom 12, of the inclosure, the walls 13 of the top being provided with circular slots 14, which operate about pins 15 to insure rigidity and stability of the device.

When the waves enter the inclosure, the top 2 is caused to yield against the tension of the springs 11, and tends to resume its normal position, such tendency causing a good portion of the water to recoil, and to offset or destroy some of the force of the wave. To prevent such action, I provide a leaf or flap valve 16, which is hingedly supported from the bottom of the top 2, such valve 16 normally resting against a similar valve 17, which in pivotally supported in the walls of the bottom of the inclosure, and the valve 17 in turn resting normally against another valve 18, similarly supported as the valve 17. The edge of the valve 18 is arranged to rest normally against a rib 19 provided in the bottom of the inclosure. The valve 16 being connected with the yielding top 2, is sufficiently long, as shown, to retain engagement with the valve 17, consequently when the force of the water lifts the top 2, the immediate return of the said top to original position is stopped or retarded by the valves 16, 17 and 18, which hold the water between them and the passageway confined, thus forcing the major portion of the water through the said passageway and eventually through the outlet, 20.

As shown in Fig. 1, the device is partially submerged so that at all times the forward or narrow end of the inclosure is filled with water. When a wave enters the inclosure, the top 2 will yield to an extent commensurate with the force of the impact, and the valve elements 16, 17 and 18 will freely swing to permit the passage of the water into the constricted end. As soon as there is a recoil or rebound of the water, the valve elements will be forced to closed position, and the major portion of the water compressed in the constricted passage way 3, eventually escaping through the outlet pipe 20 for further utilization.

What I claim is:

1. A device comprising a tapering inclosure arranged to be submerged, and being open at one end, said inclosure having a yielding top, and an outlet contiguous with said inclosure.

2. A device of the character described, comprising an inclosure arranged to be partially submerged, said inclosure being open at one end, and having a yielding top, said inclosure having at its other end a constricted passageway, divided into a plurality of compartments.

3. A device of the character described, comprising an inclosure arranged to be partially submerged, said inclosure being open at one end, and terminating at its other end in a constricted passage way, divided in compartments, valves to control the outlet from one or more of said compartments, and a flexible top on said inclosure arranged to yield to the thrust of waves.

4. A device of the character described, comprising an inclosure having a yielding top, said inclosure being open at one end for the reception of the waves, and terminating at its other end in a constricted passageway, valves in said passageway to prevent the return of water to said inclosure, and a plurality of valves in said inclosure to prevent the rebound of the water.

5. A device of the character described, comprising a tapering inclosure having a top movable relatively thereto, and a constricted passageway, divided into a plurality of compartments, an outlet for said compartments, valves to control the outlet from one or more of said compartments, and a means to prevent the rebound of water in said inclosure.

6. A device for utilizing the force of waves, comprising an inclosure having an inlet and a plurality of outlets, a yielding top on said inclosure, and means in the forward end of said inclosure to prevent the rebound of water.

7. A device for utilizing the force of waves, comprising an inclosure having outlets, an inlet and a yielding top, and a plurality of valves in said inclosure to prevent the rebound of water, one of said valves being connected to and movable with said top.

8. A device for utilizing the force of waves, comprising an inclosure having an inlet and a plurality of outlets, a top on said inclosure arranged to yield to the impact of waves, and means connected with said top and said inclosure to prevent the rebound of water.

In testimony whereof I affix my signature in the presence of two witnesses.

EMMER B. ARNOLD.

Witnesses:
JOHN E. ARNOLD,
ANTON GLOETZNER, Jr.

Copies of this patent may be obtained for five cents each, by addressing the "Commissioner of Patents, Washington, D. C."